(12) United States Patent
Zhu et al.

(10) Patent No.: US 12,180,075 B1
(45) Date of Patent: Dec. 31, 2024

(54) METHOD FOR ENRICHING CARBON DIOXIDE AND HYDROGEN BY WATER-GAS SHIFT COUPLING OF BLAST FURNACE GAS

(71) Applicant: Institute of Process Engineering, Chinese Academy of Sciences, Beijing (CN)

(72) Inventors: Tingyu Zhu, Beijing (CN); Yangyang Guo, Beijing (CN); Shuoguo Gu, Beijing (CN); Meng Ye, Beijing (CN)

(73) Assignee: Institute of Process Engineering, Chinese Academy of Sciences, Beijing (CN)

( * ) Notice: Subject to any disclaimer, the term of this patent is extended or adjusted under 35 U.S.C. 154(b) by 0 days.

(21) Appl. No.: 18/653,018

(22) Filed: May 2, 2024

(30) Foreign Application Priority Data

Oct. 11, 2023 (CN) .......................... 202311312930.6

(51) Int. Cl.
*C01B 3/58* (2006.01)

(52) U.S. Cl.
CPC ........ *C01B 3/58* (2013.01); *C01B 2203/0283* (2013.01); *C01B 2203/042* (2013.01); *C01B 2203/0435* (2013.01); *C01B 2203/0475* (2013.01); *C01B 2203/06* (2013.01); *C01B 2203/1047* (2013.01); *C01B 2203/1076* (2013.01)

(58) Field of Classification Search
CPC ...... C01B 2203/0283; C01B 2203/042; C01B 2203/0435; C01B 2203/0475; C01B 2203/06; C01B 2203/1047; C01B 2203/1076; C01B 3/58
See application file for complete search history.

(56) References Cited

FOREIGN PATENT DOCUMENTS

| CN | 107352558 A | 11/2017 |
|---|---|---|
| CN | 111321015 A | 6/2020 |

(Continued)

OTHER PUBLICATIONS

Inoue et al. JP2002241817A English Translation (Year: 2002).*

(Continued)

*Primary Examiner* — Alexandra M Moore
*Assistant Examiner* — Jordan W Taylor
(74) *Attorney, Agent, or Firm* — Pilloff Passino & Cosenza LLP; Rachel Pilloff; Sean Passino

(57) ABSTRACT

A method for enriching carbon dioxide and hydrogen by water-gas shift coupling of blast furnace gas is disclosed in the present application, belonging to the technical field of flue gas resource utilization, where the method includes: purifying the blast furnace gas by a dry purification method, followed by heating and mixing with water vapor, allowing for water vapor shift coupling reaction under an action of a catalyst to obtain a mixed gas of carbon dioxide and hydrogen; adsorbing the mixed gas of carbon dioxide and hydrogen with a carbon dioxide adsorbent and desorbing to obtain carbon dioxide; introducing a gas not adsorbed by the carbon dioxide adsorbent into a molecular sieve adsorbent to remove impurities, then obtaining a hydrogen. Blast furnace gas is used as raw material, and hydrogen is provided for subsequent hydrogen smelting while realizing carbon enrichment in the blast furnace process.

2 Claims, 2 Drawing Sheets

(56) References Cited

FOREIGN PATENT DOCUMENTS

| CN | 111647445 | A |   | 9/2020  |         |           |
|----|-----------|---|---|---------|---------|-----------|
| CN | 112374458 | A |   | 2/2021  |         |           |
| CN | 114955992 | A | * | 8/2022  | ........ | B01D 53/047 |
| CN | 116161618 | A | * | 5/2023  |         |           |
| JP | 2002241817| A | * | 8/2002  |         |           |
| JP | 2009126737| A |   | 6/2009  |         |           |
| JP | 2009226257| A |   | 10/2009 |         |           |

OTHER PUBLICATIONS

Li et al. CN114955992A English Translation (Year: 2022).*
Liu et al. CN116161618A English Translation (Year: 2023).*
Notification to Grant Patent for China Application No. 202311312930.6, mailed May 27, 2024.
First Search Report for China Application No. 202311312930.6, dated Feb. 27, 2024.
Supplementary Search Report for China Application No. 202311312930.6, dated May 21, 2024.
First Office Action for China Application No. 202311312930.6, mailed Mar. 1, 2024.
Liu Sheng et al., "Research Progress on Removal of Hydrogen Sulfide from Blast Furnace Gas by Adsorption Method," Chemical Fertilizer Design, Aug. 2020, vol. 58, No. 4.

* cited by examiner

METHOD FOR ENRICHING CARBON DIOXIDE AND HYDROGEN BY WATER-GAS SHIFT COUPLING OF BLAST FURNACE GAS

CROSS-REFERENCE TO RELATED APPLICATIONS

This application claims priority to Chinese Patent Application No. 202311312930.6, filed on Oct. 11, 2023, the contents of which are hereby incorporated by reference.

TECHNICAL FIELD

The present application relates to the technical field of flue gas resource utilization, and in particular to a method for enriching carbon dioxide and hydrogen by water-gas shift coupling of blast furnace gas.

BACKGROUND

Iron making process is the major process of the iron and steel industry, and the existing iron making process mostly adopts a long-term process of blast furnace-converter, in which for every tonne of pig iron produced, 1300-1600 cubic meters ($m^3$) of blast furnace gas will be generated, and the components of the blast furnace gas are complex, containing conventional components such as $N_2$, $CO_2$, CO, $O_2$, $H_2O$, etc., in addition to hydrocarbons of low concentration, such as $H_2$, $CH^4$ and other toxic and hazardous gases such as $H_2S$, COS, HCl, etc., making the blast furnace gas both a gas fuel of low calorific value and an important source of secondary energy, as well as a typical toxic and hazardous industrial waste gas. To improve the utilization of blast furnace gas, the resource utilization of blast furnace gas has emerged as an important technological development trend in recent years. The resource utilization is accompanied by the decarbonization of the gas, which reduces the $CO_2$ emission from the blast furnace process and supports the low-carbon development of the iron and steel industry.

CN112374458A discloses a method and a device for producing hydrogen from iron-making blast furnace coal gas, whereby iron-making blast furnace gas is depressurized to obtain depressurized blast furnace gas, the depressurized blast furnace gas is subjected to pressure-conversion adsorption of $CO_2$ and CO, and nitrogen is removed to obtain a concentrated gas, the CO of the concentrated gas is processed by water vapor shift to produce hydrogen to obtain a hydrogen-containing converted gas, the hydrogen-containing gas mixture is decarbonised by pressure-conversion adsorption and separated and purified to obtain pure hydrogen. In this patent application, the process route is clear and easy to implement, yet $CO_2$ is also generated after CO water-gas shift, in which there are two steps of carbon removal and $CO_2$ will not be reused as product gas. CN114955992A discloses a production process for producing hydrogen from blast furnace gas, and proposes to carry out water-gas shift first, and then use liquid amine absorption method to recover $CO_2$, and to conduct hydrogen extraction by variable pressure adsorption; the core point lies in that the precious metal-loaded $WMoO_x$ catalyst is capable of prolonging the tolerance and duration of the water-gas shift reaction; however, the method of wet alkali washing and absorption method for $CO_2$ enrichment adopted in the patent do not match well with the high pressure conditions of the previous unit of water-gas shift and the operation cost is relatively high.

SUMMARY

The purpose of the present application is to provide a method for enriching carbon dioxide and hydrogen by water-gas shift coupling of blast furnace gas, so as to solve the problems existing in the prior art.

In order to achieve the above objectives, the present invention provides the following scheme.

One of the technical schemes of the present application: a method for enriching carbon dioxide and hydrogen by water-gas shift coupling of blast furnace gas, including following steps:
  purifying the blast furnace gas by a dry purification method, followed by heating and mixing with water vapor, allowing for a water vapor shift coupling reaction under an action of a catalyst to obtain a mixed gas of the carbon dioxide and hydrogen;
  the dry purification method is realized by adopting a multilayer composite adsorbent; and components of the multilayer composite adsorbent include one or more of alkali-modified activated carbon, molecular sieve and alumina.

Optionally, when the components of the multilayer composite adsorbent are alkali-modified activated carbon, molecular sieve and alumina, a mass ratio of the alkali-modified activated carbon, molecular sieve and alumina is (3-5):(3-5): 2.

More optionally, the mass ratio of the alkali-modified activated carbon, molecular sieve and alumina is 3:5:2, 4:4:2 or 5:3:2.

Optionally, a temperature of the blast furnace gas after purification is 160-220 degrees Celsius (° C.), a pressure is 0.18-0.3 megapascal (MPa), and a temperature of the heating is 320-400° C.

Optionally, the catalyst is an iron-based catalyst; and a space velocity of the water vapor shift coupling reaction is 400-1200 per hour ($h^{-1}$).

Optionally, after the water vapor shift coupling reaction, the water vapor shift coupling reaction is carried out again.

Optionally, a temperature for carrying out the water vapor shift coupling reaction again is 200-250° C., with a catalyst of a copper-based catalyst, and a space velocity of 2000-3600 $h^{-1}$.

Optionally, the method further includes steps of separating and purifying the mixed gas of carbon dioxide and hydrogen; and
  the steps of separating and purifying specifically include: adsorbing the mixed gas of carbon dioxide and hydrogen with a carbon dioxide adsorbent and desorbing to obtain carbon dioxide; introducing a gas not adsorbed by the carbon dioxide adsorbent into a molecular sieve adsorbent to remove impurities, then obtaining a hydrogen.

The water-gas shift (WGS) reaction ($CO+H_2O \rightarrow H_2+CO_2$) is usually carried out under high temperature (320-400° C.) and high pressure (1.0-6.0 MPa), while the temperature of blast furnace gas after cooling and dust removal is generally around 160-220° C. and the pressure is 0.2-0.3 MPa, a temperature range allowing for the water-gas shift. Therefore, by utilizing the characteristics of high temperature and high pressure of blast furnace gas and carrying out water-gas shift reaction to produce hydrogen, 20-30 volume percent (vol. %) of CO in the gas is converted into $CO_2$ and $H_2$, so as to increase the concentration of $CO_2$ and $H_2$ in the gas, reduce the process cost of $CO_2$ enrichment and hydrogen extraction, and achieve the comprehensive resourceful use of the gas.

Another technical scheme of the present application: a device for preparing carbon dioxide and hydrogen by using blast furnace gas, used for realizing the method for enriching carbon dioxide and hydrogen by water-gas shift coupling of blast furnace gas, including a gas compressor, a first gas-water separator, a gas pretreatment tower, a first-stage adiabatic shift furnace, a second-stage adiabatic shift furnace, a residual heat and pressure turbine generator, a second gas-water separator, a $CO_2$ adsorption tower, a compressor, and a hydrogen extraction tower connected in sequence.

Optionally, steps for realizing the method for enriching carbon dioxide and hydrogen by water-gas shift coupling of blast furnace gas by adopting the device specifically include:

(1) purifying the blast furnace gas by a blast furnace gas purification unit, where the blast furnace gas is pressurized to 2.0-3.4 MPa by the gas compressor, and then enters the gas pretreatment tower for purification after passing through the first gas-water separator; the gas pretreatment tower adopts the dry purification method and is filled with a multilayer composite adsorbent to remove HCl, COS and $H_2S$ in the gas components, so as to obtain purified blast furnace gas (the temperature is 160-220° C., the pressure is 0.18-0.3 MPa, and the concentrations of COS, $H_2S$ and HCl are reduced to below 5 mg/$Nm^3$, 5 mg/$Nm^3$ and 1 mg/$Nm^3$); the gas pretreatment tower is equipped with oxygen-containing gas purging to prevent the adsorbent from blocking;

the components of the multilayer composite adsorbent are alkali-modified activated carbon, molecular sieve and alumina in the mass ratio of 3:5:2, 4:4:2 or 5:3:2;

the oxygen-containing gas purging is mainly conducted by compressed air, with functions of accelerating an oxidation of S on the adsorbent and preventing the adsorbent from blocking; the multilayer composite adsorbent saturated by adsorption may be mixed and burned in a sintering process, and a final solidification of the S may be realized through a terminal flue gas desulfurization device; after adsorption saturation, fresh adsorbent may be replaced, with a replacement method of overall replacement;

(2) using a CO water-gas shift reaction unit to carry out a shift reaction between gas CO and water vapor, including: heating the purified blast furnace gas to 320-400° C., and carrying out a water vapor shift reaction with the water vapor generated by a water vapor generator in a first-stage adiabatic shift furnace to produce $CO_2$ and $H_2$, using an iron-based catalyst with a space velocity of 400-1200 $h^{-1}$, where the gas temperature is reduced to 200-250° C. after heat exchange and the gas enters a second-stage adiabatic shift furnace, using a copper-based catalyst with an space velocity of 2000-3600 $h^{-1}$, continuously converting the CO in the gas into $H_2$ and $CO_2$, where the CO concentration in the gas is reduced to below 0.2 vol. %, the $CO_2$ concentration in the gas is increased to above 40 vol. %, and the $H_2$ concentration is increased to above 25 vol. % after the reaction;

catalyst beds in the first-stage adiabatic shift furnace and the second-stage adiabatic shift furnace are adiabatic beds, segmented baffles are arranged in the furnaces to support the catalyst, and a heat exchanger is arranged between the two-stage adiabatic shift furnaces to recover excess reaction latent heat (3) enriching $CO_2$ by using a pressure swing adsorption separation unit of $CO_2$: the temperature of the converted gas is reduced to 30-50° C. and the pressure is reduced to 0.3 MPa through the residual heat and pressure turbine generator, and then the gas enters the $CO_2$ adsorption tower filled with a $CO_2$ adsorbent (molecular sieve or silica gel); a bottom of the adsorption tower is designed with an alumina layer to adsorb water vapor of low-concentration in the gas to reduce the influence on $CO_2$ adsorption; after the adsorption tower is saturated, $CO_2$ is enriched from the bottom by a vacuum pump, and the enriched ($CO_2$ concentration above 95 vol. %) $CO_2$ enters a $CO_2$ storage tank for temporary storing;

the residual heat and pressure turbine generator uses the pressure energy and heat energy of gas to make the gas do work through a turbine expander and convert it into mechanical energy, so as to drive a motor to realize secondary energy recovery, and the turbine power is above 85%;

the $CO_2$ adsorption tower is an adsorption device consisting of 4-5 adsorption towers connected in series or in parallel (multiple adsorption towers are used to ensure the continuous capture of $CO_2$ in the blast furnace gas), and the enrichment of $CO_2$ is completed according to the operation steps of boosting, adsorption, pressure equalization, desorption, purging and the like, and the pressure equalizing times of the adsorption tower may be set to 1-3 times; a method for the desorption is vacuum desorption, where a pressure may be set at 10-80 kPa;

(4) enriching $H_2$ by using $H_2$ pressure swing adsorption purification unit: the gas not adsorbed at the top of the $CO_2$ adsorption tower is mainly $H_2$ and $N_2$, with small amount of $CH_4$ and CO, the gas is pressurized by the compressor to 3-5 MPa, and enters into the hydrogen tower, which is loaded with deoxidizer, CO and $CH_4$ adsorbent (mainly molecular sieve adsorbent), and after the adsorption cycle, the gas discharged from the top of the tower is high-concentration $H_2$ (the concentration is increased to more than 99 vol. %), and enters into the hydrogen storage tank for temporary storing, which may be used as the raw material for high purity hydrogen purification; and the hydrogen extraction tower is provided with 3-9 towers connected in series or in parallel, and the pressure equalizing times are set to 3-5 times; the deoxidizer, CO and $CH_4$ adsorbents are metal-modified molecular sieve adsorbents, such as copper-modified molecular sieves.

The present application has the following technical effects.

In the present application, the emission characteristics of high temperature and high pressure of blast furnace gas are fully utilized, and through water-gas shift, the concentration of $CO_2$ and $H_2$ at the inlet of the pressure swing adsorption device is increased, the power consumption required for subsequent gas separation is reduced, and the overall energy consumption is reduced by 20% compared with the existing process, boasting good economic benefits.

The present application takes blast furnace gas as raw material and adopts the all-dry treatment process to generate product gas with high concentration of $CO_2$ and $H_2$ through gas purification, CO water vapor shift, $CO_2$ pressure swing adsorption enrichment and $H_2$ pressure swing adsorption purification, so as to achieve carbon enrichment of the blast furnace process and at the same time to provide hydrogen for the use of subsequent hydrogen smelting.

The method provided by the present application allows CO in blast furnace gas to be converted into hydrogen and $CO_2$, thus improving the concentration of $CO_2$ and hydrogen in raw gas, reducing the energy consumption and cost in the pressure swing adsorption enrichment and purification process, and obtaining high-concentration $CO_2$ and hydrogen. The separated $CO_2$ may be used for large-scale utilization such as mineralization and storage, and the enriched $H_2$ may be used as high-purity hydrogen raw material for hydrogen smelting and other purposes. The method provided by the present application provides a new method for high-value utilization and carbon reduction of blast furnace gas, with which hydrogen production enjoys good economic benefits, and the efficient and low-cost enrichment of $CO_2$ is also achieved, providing a new pathway for the low-carbon and green development of the iron and steel industry.

BRIEF DESCRIPTION OF THE DRAWINGS

In order to explain the embodiments of the present application or the technical scheme in the prior art more clearly, the drawings needed in the embodiments are briefly introduced below. Obviously, the drawings described below are only some embodiments of the present application, and other drawings may be obtained according to these drawings without creative work for ordinary people in the field.

DETAILED DESCRIPTION OF THE EMBODIMENTS

A number of exemplary embodiments of the present application are now described in detail, and this detailed description should not be considered as a limitation of the present application, but should be understood as a more detailed description of certain aspects, characteristics and embodiments of the present application.

It should be understood that the terminology described in the present application is only for describing specific embodiments and is not used to limit the present application. In addition, for the numerical range in the present application, it should be understood that each intermediate value between the upper limit and the lower limit of the range is also specifically disclosed. The intermediate value within any stated value or stated range and every smaller range between any other stated value or intermediate value within the stated range are also included in the present application. The upper and lower limits of these smaller ranges may be independently included or excluded from the range.

Unless otherwise specified, all technical and scientific terms used herein have the same meaning as commonly understood by one of ordinary skill in the art to which this application relates. Although the present application only describes the preferred methods and materials, any methods and materials similar or equivalent to those described herein may also be used in the practice or testing of the present application. All documents mentioned in this specification are incorporated by reference to disclose and describe methods and/or materials related to the documents. In case of conflict with any incorporated document, the contents of this specification shall prevail.

It is obvious to those skilled in the art that many improvements and changes may be made to the specific embodiments of the present application without departing from the scope or spirit of the present application. Other embodiments will be apparent to the skilled person from the description of the application. The specification and embodiments of this application are only exemplary.

The terms "including", "comprising", "having" and "containing" used in this specification are all open terms, which means including but not limited to.

The blast furnace gas treated in the following embodiments of the present application consists of 15-30 vol. % $CO_2$, 15-30 vol. % Co, 0.1-5 vol. % $H_2$, 30-60 vol. % $N_2$, 0-1.5 vol. % $O_2$, 20-200 mg/m$^3$ $H_2S$ and 20-160 mg/m$^3$ COS, 2-6 vol. % water vapor, 5-20 mg/m$^3$ HCl, and 0.2-0.4 vol. % $CH_4$.

Figure 1:
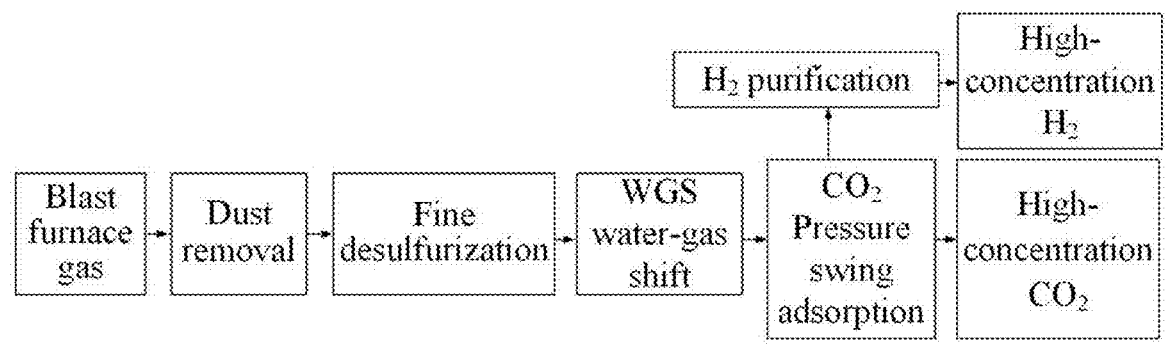
FIG. 1 is a schematic diagram of the process for enriching and purifying carbon dioxide and hydrogen by CO water-gas shift coupling of blast furnace gas of the present application.

FIG. 1 is a schematic diagram illustrating the process of CO water-gas shift coupling enrichment and purification of carbon dioxide and hydrogen in blast furnace gas of the present application.

Figure 2:
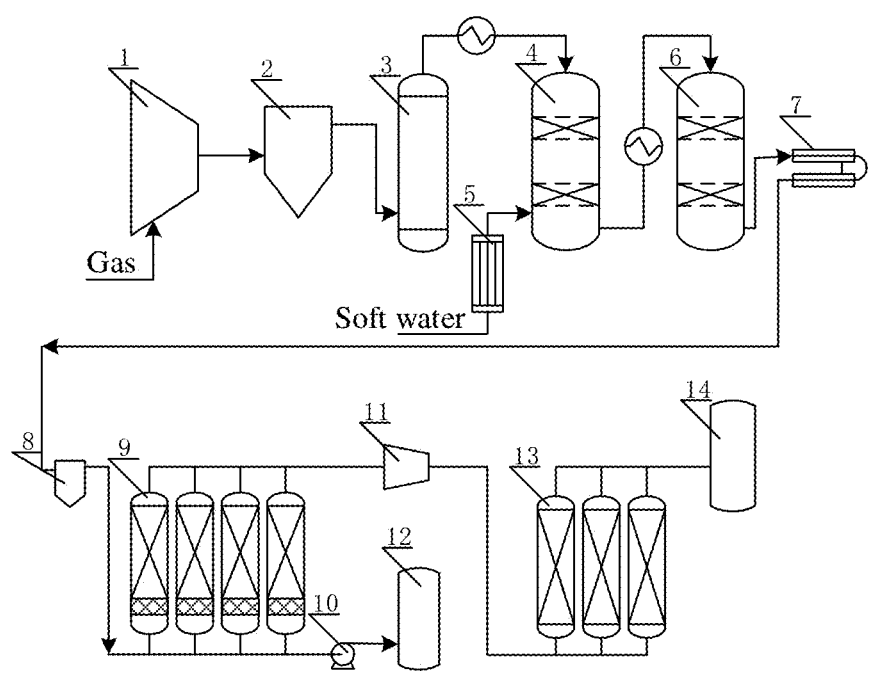
FIG. 2 is a schematic structural diagram of a device for enriching and purifying carbon dioxide and hydrogen by CO water-gas shift coupling of blast furnace gas.

The structural schematic diagram of the device for enriching and purifying carbon dioxide and hydrogen by CO water-gas shift coupling of blast furnace gas is shown in FIG. 2. The device for enriching and purifying carbon dioxide and hydrogen by CO water-gas shift coupling of blast furnace gas includes a gas compressor 1, a gas-water separator 2, a gas pretreatment tower 3, a first-stage adiabatic shift furnace 4, a water vapor generator 5, a second-stage adiabatic shift furnace 6, a residual heat and pressure turbine generator 7, a gas-water separator 8, a $CO_2$ adsorption tower 9, a vacuum pump 10, a compressor 11, a $CO_2$ storage tank 12, a hydrogen extraction tower 13, and a $H_2$ storage tank 14.

Embodiment 1

A method for enriching and purifying carbon dioxide and hydrogen by CO water-gas shift coupling of blast furnace gas:

the compositions of blast furnace gas are: 20 vol. % $CO_2$, 25 vol. % CO, 3% $H_2$, 45 vol. % $N_2$, 0.2 vol. % $O_2$, 150 mg/m$^3$ $H_2S$, 100 mg/m$^3$ COS, 6 vol. % water vapor, 10 mg/m$^3$ HCl and 0.3 vol. % $CH_4$.

(1) Purification of the blast furnace gas by a blast furnace gas purification unit: after being discharged from the top of the blast furnace, the blast furnace gas is dedusted and cooled by gravity dust removal and bag dust removal, the pressure after dedusting and cooling is 0.18 MPa, and the pressure is increased to 2.5 MPa by the gas compressor 1, then the gas enters the gas pretreatment tower 3 for purification after passing through the gas-water separator 2, and the gas pretreatment tower 3 adopts a dry purification method and is filled with multilayer composite adsorbents (the components of multilayer composite adsorbents are alkali-modified activated carbon, molecular sieve and alumina with a mass ratio of 4:4:2), HCl, COS and $H_2S$ in the gas components are removed (fine desulfurization) to obtain purified blast furnace gas (with temperature of 180° C. and pressure of 2.5 MPa), where the pretreatment tower is equipped with oxygen-containing gas purging.

The concentrations of COS, $H_2S$ and HCl at the inlet of gas pretreatment tower 3 are 150 mg/Nm$^3$, 100 mg/Nm$^3$ and 10 mg/Nm$^3$, respectively. After purification, the concentrations of COS, $H_2S$ and HCl at the outlet are reduced to below 5 mg/Nm³, 5 mg/Nm³ and 1 mg/Nm³, respectively, and the concentrations of $CO_2$, CO and $H_2$ in the purified gas are 20 vol. %, 25 vol. % and 3 vol. %, respectively.

(2) Shift reaction between gas CO and water vapor using a CO water-gas shift (WGS) reaction unit: the purified blast furnace gas is heated to 350° C. through a heat exchanger, and the purified blast furnace gas and the water vapor generated by the water vapor generator 5 are subjected to a water vapor shift reaction in the first-stage adiabatic shift furnace 4 to generate $CO_2$ and $H_2$, and the reaction space velocity is 600 h⁻¹; the iron-based catalyst is adopted, and the components of the outlet gas are converted into $CO_2$ with a concentration of 30 vol. %, CO with a concentration of 15 vol. %, and $H_2$ with a concentration of 13 vol. %; after the reaction, the temperature of the gas is reduced to 200-250° C. by heat exchange, and the gas enters the second-stage adiabatic shift furnace 6, where CO in the gas is continuously converted into $H_2$ and $CO_2$, and the space velocity is 3000 h⁻¹ by using a copper-based catalyst; the compositions of the outlet gas are adjusted to $CO_2$ with a concentration of 44 vol. %, CO with a concentration of 0.2 vol. % and $H_2$ with a concentration of 27 vol. %.

The catalyst beds in the first-stage adiabatic shift furnace 4 and the second-stage adiabatic shift furnace 6 are adiabatic beds, and segmented baffles are arranged in the furnaces to support the catalyst, and a heat exchanger is arranged between the two adiabatic shift furnaces to recover excess reaction latent heat.

(3) Enrichment of $CO_2$ by using a pressure swing adsorption separation unit of $CO_2$: the temperature of the converted gas is reduced to 40° C. and the pressure is reduced to 0.3 MPa through the residual heat and pressure turbine generator 7 (with a turbine power of above 85%), then the gas passes through the gas-water separator 8, and enters the $CO_2$ adsorption tower 9, where a $CO_2$ adsorbent (molecular sieve) is filled in the $CO_2$ adsorption tower 9, and the bottom of the $CO_2$ adsorption tower 9 is provided with an alumina layer to adsorb low-concentration water vapor in the gas. After the adsorption tower is saturated, $CO_2$ is desorbed from the bottom by the vacuum pump 10 (with a pressure of 20 kPa), and the desorbed $CO_2$ enters the $CO_2$ storage tank 12 for temporary storing, and the desorbed $CO_2$ concentration is 95 vol. %.

The $CO_2$ adsorption tower 9 is an adsorption device composed of four adsorption towers connected in parallel, and $CO_2$ enrichment is completed according to the operation steps of boosting, adsorption, pressure equalization, desorption, purging, etc. The pressure equalizing times of the adsorption tower may be set to two times.

(4) Enrichment of $H_2$ by using $H_2$ pressure swing adsorption purification unit: the gas not adsorbed at the top of $CO_2$ adsorption tower is mainly composed of $H_2$ with a concentration of 48 vol. %, and the rest is $N_2$ and a small amount of CO and $CH_4$. The gas is pressurized to 4 MPa by compressor 11, and enters into hydrogen extraction tower 13, which is filled with deoxidizer, CO and $CH_4$ adsorbent (copper modified molecular sieve), and the gas discharged from the top of the tower after adsorption cycle is high concentration $H_2$ (with a concentration increased to 99 vol. %), which enters the $H_2$ storage tank 14 for temporary storing, and may be used as a raw material for high-purity hydrogen purification.

The hydrogen extraction tower 13 is provided with three towers connected in parallel, and the number of pressure equalizing is set to three times.

According to the method of this embodiment, the concentrations of $CO_2$ and $H_2$ at the inlet of the pressure swing adsorption device are improved through water-gas conversion, and the power consumption required for subsequent gas separation is reduced. Compared with the existing process, the overall energy consumption is reduced by 20%, the purity of $CO_2$ product gas is 95 vol. %, and the concentration of $H_2$ reaches 99 vol. %, thus realizing carbon reduction and hydrogen extraction at the same time of gas, with good economic benefits.

The above-mentioned embodiments only describe the preferred mode of the present application, and do not limit the scope of the application. Under the premise of not departing from the design spirit of the application, various modifications and improvements made by ordinary technicians in the field to the technical scheme of the application shall fall within the protection scope determined by the claims of the application.

What is claimed is:

1. A method for enriching carbon dioxide and hydrogen by water-gas shift coupling of blast furnace gas, comprising following steps:

purifying the blast furnace gas by a dry purification method, followed by heating and mixing with water gas, allowing for a water-gas shift coupling reaction under an action of a catalyst to obtain a mixed gas of the carbon dioxide and hydrogen; wherein components of the blast furnace gas comprise 15-30 vol. % $CO_2$, 15-30 vol. % CO, 0.1-5 vol. % $H_2$, 30-60 vol. % $N_2$, 0-1.5 vol. % $O_2$, 20-200 mg/m³ $H_2S$, 20-160 mg/m³ COS, 2-6 vol. % water gas, 5-20 mg/m³ HCl, and 0.2-0.4 vol. % $CH_4$; and the dry purification method is performed with a multilayer composite adsorbent that consists of alkali-modified activated carbon, molecular sieve and alumina; wherein the mass ratio of alkali-modified activated carbon: molecular sieve:alumina is (3-5):(3-5):2; wherein the blast furnace gas after purification has a concentration of 20 vol. % $CO_2$, 25 vol. % CO, and 3 vol. % $H_2$;

a temperature of the blast furnace gas after purification is 160-220° C., a pressure is 0.18-0.3 MPa, and a temperature of the heating is 320-400° C.;

the catalyst is an iron-based catalyst; and a space velocity of the water-gas shift coupling reaction is 400-1200 h⁻¹; and after the water-gas shift coupling reaction, the water-gas shift coupling reaction is carried out again; and a temperature for carrying out the water-gas shift coupling reaction again is 200-250° C., with a catalyst of a copper-based catalyst, and a space velocity of 2000-3600 h⁻¹.

2. The method according to claim 1, further comprising separating and purifying the mixed gas of carbon dioxide and hydrogen by adsorbing the mixed gas of carbon dioxide and hydrogen with a carbon dioxide adsorbent and desorbing to obtain carbon dioxide; introducing a gas not adsorbed by the carbon dioxide adsorbent into a molecular sieve adsorbent to remove impurities, then obtaining a hydrogen.

* * * * *